(12) United States Patent
Escobar-Bowser

(10) Patent No.: US 7,746,591 B2
(45) Date of Patent: Jun. 29, 2010

(54) METHODS AND APPARATUS TO PROVIDE DYNAMICALLY-BIASED WRITE DRIVERS FOR HARD DISK DRIVE (HDD) APPLICATION

(75) Inventor: Priscilla Enid Escobar-Bowser, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 7 days.

(21) Appl. No.: 12/333,997

(22) Filed: Dec. 12, 2008

(65) Prior Publication Data

US 2009/0153991 A1 Jun. 18, 2009

Related U.S. Application Data

(60) Provisional application No. 61/013,883, filed on Dec. 14, 2007.

(51) Int. Cl.
*G11B 5/02* (2006.01)
(52) U.S. Cl. .................... 360/68; 360/46; 327/110; 330/255
(58) Field of Classification Search .................. None
See application file for complete search history.

(56) References Cited

U.S. PATENT DOCUMENTS 7,242,544 B2 * 7/2007 Price et al. ............... 360/46
2005/0237785 A1 10/2005 Venca et al.

* cited by examiner

*Primary Examiner*—K. Wong
(74) *Attorney, Agent, or Firm*—Dawn V. Stephens; Wade James Brady, III; Frederick J. Telecky, Jr.

(57) ABSTRACT

Methods and apparatus to provide dynamically biased write drivers for hard disk drive applications are described. According to one example, a hard disk drive write system includes a drive signal generator to receive data to be written to a hard disk drive platter and to generate drive signals including a boost signal. A drive circuit is configured to receive the drive signals and to generate currents for output to the transmission line based thereon, wherein the currents include a boost current. A variable bias circuit is configured to detect the boost signal generated by the drive signal generator and to vary a bias signal provided to the impedance matching circuit based on the detection of the boost signal. In such an example arrangement, the impedance matching circuit matches impedances between the drive circuit and the transmission line in response to the bias signal provided by the variable bias circuit.

20 Claims, 2 Drawing Sheets

METHODS AND APPARATUS TO PROVIDE DYNAMICALLY-BIASED WRITE DRIVERS FOR HARD DISK DRIVE (HDD) APPLICATION

CROSS-REFERENCE TO RELATED APPLICATION

This application claims the benefit of U.S. Provisional Application No. 61/013,883, filed Dec. 14, 2007, the entirety of which is incorporated by reference.

TECHNICAL FIELD

The disclosure pertains to information storage systems and, more particularly, to methods and apparatus provide dynamically biased write drivers for HDD applications.

BACKGROUND

Hard disk drives store information on one or more disks or platters that rotate about a spindle with respect to one or more heads, such as read and/or write heads. Write heads are highly inductive devices that are controlled by write circuitry that controls current through the write head to create local electromagnetic fields that magnetize portions of a disk drive platter to impart information thereto. For example, the hard drive write circuitry may pass current through the write head in a first direction to write a first logical data bit (e.g., a logical one) to a platter. Conversely, the hard drive write circuitry may cause current to pass through the write head in a second direction opposite the first direction to write a second logical data bit (e.g., a logical zero) to the platter. Because the current through the write head must change direction to write different bits of information to the platter and because fast data write speeds are needed, it follows that, when writing information to a platter, there is a significant change in current through the write head in a small period of time, which results in a large change in current per unit of time (i.e., a large dI/dt).

Hard drive write circuitry, which may be implemented in an open loop H-bridge topology, is coupled to a write head through a transmission line. The highly inductive nature of a hard drive write head means that hard drive write circuitry may consume significant amounts of power given the fast data speeds at which information is written to platters in hard drives. That is, the hard drive write circuitry is required to change current though the write head rapidly to accommodate fast hard drive write circuitry.

Rapidly changing the current through an inductive hard drive write head requires impedance matching within the hard drive write circuitry because of the large current swings in the write head. At high data rates, the impedance matching is conventionally implemented as an open control loop. Such impedance matching circuits consume significant amounts of power to maintain the impedance match between the hard drive write circuitry and the write head while absorbing initial power reflection resulting from the current launched into the inductive head that is required to energize the write head. At high data rates, having large changes in current per unit of time (dI/dt) are required to drive the write head. In such cases, the open loop impedance matching circuitry saturates and, thus, the strength of the impedance match provided by the same weakens. The weakening of the impedance match between the write circuitry and the write head causes the write circuitry to lose control of the peak current launched into the write head. Impedance matching using known closed control loops is insufficiently fast to keep up with the operating speed of an open loop H-bridge write drive topology.

SUMMARY

Methods and apparatus to provide dynamically biased write drivers for hard disk drive (HDD) applications are described. According to one example, a hard disk drive write system includes a drive signal generator to receive data to be written to a hard disk drive platter and to generate drive signals based thereon, wherein the drive signals include a boost signal. A drive circuit is electrically coupled to the drive signal generator and to a transmission line and configured to receive the drive signals and to generate currents for output to the transmission line based thereon, wherein the currents include a boost current. A variable bias circuit is electrically coupled to the drive signal generator and an impedance matching circuit, wherein the variable bias circuit is configured to detect the boost signal generated by the drive signal generator and to vary a bias signal provided to the impedance matching circuit based on the detection of the boost signal. In such an example arrangement, the impedance matching circuit is electrically coupled to the variable bias circuit, the drive circuit, and the transmission line to match impedances between the drive circuit and the transmission line in response to the bias signal provided by the variable bias circuit.

DETAILED DESCRIPTION

As described in detail below, system, circuits, and methods for performing dynamic biasing of write drivers in a HDD system include, for example, in an open control loop fashion, dynamically biasing portions of an impedance matching circuit. In one example, the dynamic biasing is controlled using a fraction of the same stimulus that, for example, is used to switch output transistors of a hard disk drive H-bridge circuit (e.g., boost signals, etc.). Through the use of the example dynamic biasing described herein, standing quiescent current of the circuit is lowered while the impedance between the write driver and the write head remains matched because current provided to the impedance matching circuit is dynamically boosted during the appropriate time period to absorb voltage reflection resulting from launching a current into the highly inductive write head.

Implementations of systems according to the following example teachings may result in as much as a five-time reduction in standing power consumption as compared to other known approaches, while maintaining overshoot current control through dynamic biasing. Such power reduction is desirable in battery-based applications such as hard disk drives in portable computers (e.g., laptops), portable media players (e.g., iPods), and the like. In addition to power savings, the dynamic biasing examples described herein provide wide dynamic output range and tight control of current provided to the write head because the impedance is substantially continuously matched while current consumption is kept as low as reasonably possible. Thus, due to the tight write head current control, systems implemented in accordance with the example teachings described herein may have a better bit error rate than systems not including the example described dynamic biasing. Accordingly, the systems, methods, and circuits described herein may result not only in improvements in power consumption, but in improved HDD speed because the number of write errors to the media (e.g., platters) may be reduced.

Figure 1:
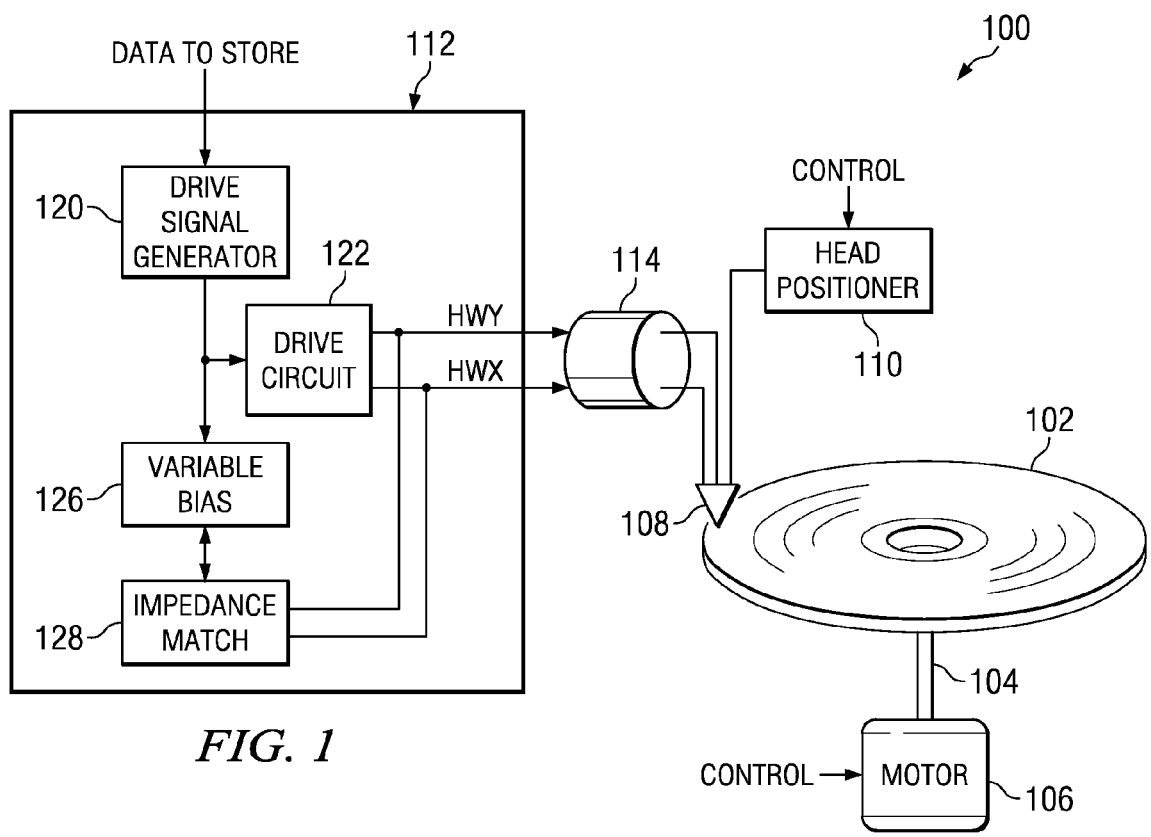
FIG. 1 is a diagram of a system including a HDD write head and a write driver including a variable bias and an impedance match.

As shown in FIG. 1, a HDD system 100 of a computer may include at least one magnetizable platter 102 that spins about a spindle 104 coupled to a motor 106. To write information to the platter 102, an inductive write head 108 is disposed in proximity to the platter 102. The write head 108 is located on a mechanical armature (not shown) that enables the write head 108 to be moved radially with respect to the platter 102, such that while the platter 102 spins the write head 108 may be positioned to access any desired portion of the platter 102. The radial position of the write head 108 is controlled by a head positioned 110. Both the motor 106 and the head positioned 110 receive control signals from other portions of the HDD system 100 that are not shown in FIG. 1.

The HDD system 100 may be located within a computer system, such as a portable computer system, a portable media player, etc. Thus, the system in which the HDD system 100 is located may need to write data to the platter 102 of the HDD system 100. For example, a processor of a computer system may need to store information on the platter 102, as a result of calculations, or any other data processing or data storage needs. The data to be stored on the platter 102 is provided to a drive write system 112. As explained in further detail below, the drive write system 112 receives the data and produces hard drive write signals (HWX and HWY) that are coupled to the write head 108 via a transmission line 114 that couples the drive write system 112 to the write head 108, which is disposed on a mechanical structure (not shown) so that the write head 108 is proximate the platter 102. That is, the drive write system 112 converts digital data to be stored into currents that are coupled to the write head 108 to cause the write head 108 to generate electromagnetic fields to magnetize portions of the platter 102 in a manner representative of the data to be stored.

As shown in FIG. 1, in one example the drive write system 112 includes a drive signal generator 120, a drive circuit 122, a variable bias circuit 126, and an impedance match 128. Each of the drive signal generator 120, the drive circuit 122, the variable bias circuit 126, and the impedance match 128 may be implemented using discrete or integrated circuit components that are configured as shown in further detail in FIG. 2. Of course, FIG. 2 only represents examples of implementations and it is contemplated that other implementations may be possible.

The drive signal generator 120 receives the data to be written to the platter 102 and generates drive signals that are coupled to both the drive circuit 122 and variable bias circuit 126. The drive signal generator 120 is implemented with knowledge of the drive circuit 122 configuration such that the drive signal generator 120 receives a stream of bits and produces data write and boost signals corresponding to each bit. The data write and boost signals are configured to control the drive circuit 122 such that the drive circuit will create write signals (that are coupled to HWX and HWY) having the appropriate current amplitude and timing, including any current overshoots, to allow the write head 108 to impart information to the platter 102.

As described in further detail below, the drive circuit 122 may be an H-bridge circuit configuration, the operation of which may be used to pass current through the write head 108 in either direction with the proper magnitude and timing. To that end, the drive circuit 122 may include data write inputs to receive data write signals, and produce output currents based thereon. Additionally, the drive circuit 122 may include boost inputs to received boost signals provided by the drive signal generator 120 and to generate, based thereon, boosted write currents that are provided to the write head 108.

In one example, the variable bias circuit 126 receives drive signals from the drive signal generator 120 and varies the bias provided to the impedance match 128 based thereon. For example, in response to a boost drive signal from the drive signal generator 120, the variable bias circuit 126 may increase a bias current provided to the impedance match 128 so that the impedance match 128, which, as described in the example below may be implemented as a translinear loop (e.g., a loop circuit), can accommodate the voltage reflection caused when the drive circuit 122 launches a current into a highly inductive write head (e.g., the write head 108) during the boost operation. Although the variable bias circuit 126 and the impedance match 128 are shown as single blocks that perform variable biasing and impedance matching for the drive circuit 122 that produces the write signals HWX and HWY, the variable bias circuit 126 and the impedance match 128 may be implemented as several circuits or sets of circuits.

Figure 2:
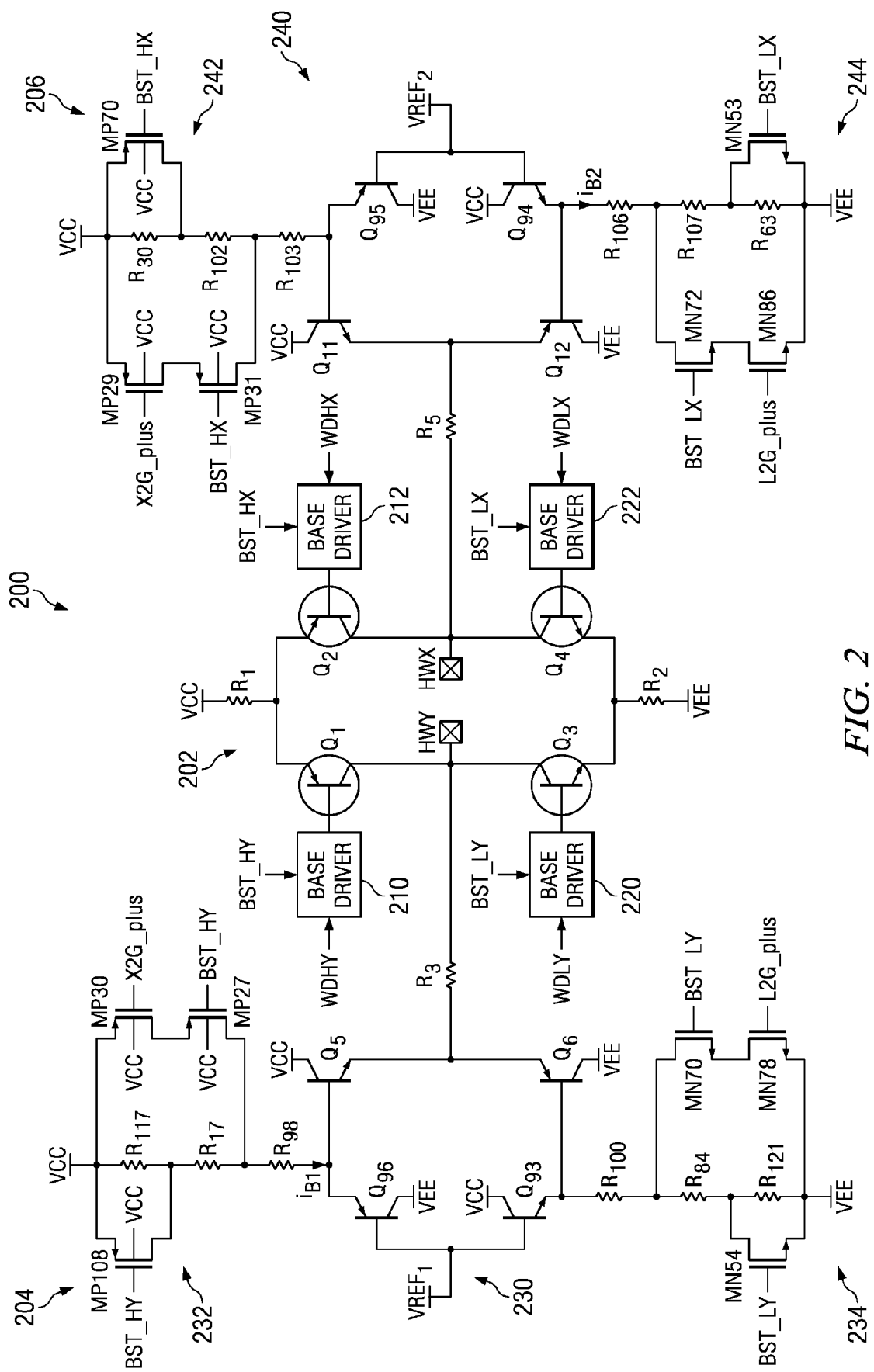
FIG. 2 is schematic diagram showing additional detail of the drive circuit, the variable bias, and the impedance match of FIG. 1.

One example implementation of the drive write system 112 of FIG. 1, is shown in FIG. 2 at reference numeral 200. In general, the drive write system 200 includes a drive circuit 202 and separately controlled first and second sets of bias and impedance match circuitry 204, 206. As described in detail below, the drive write system 200 receives drive signals from a drive signal generator (e.g., the drive signal generator 120) and outputs current signals on lines HWX and HWY to which a write head (e.g., the write head 108) is coupled. The currents provided to the write head induce magnetic fields on a platter (e.g., the platter 102) to store information thereon. The first and second sets of bias and impedance match circuitry 204, 206 are respectively coupled to the lines HWY and HWX, respectively, and receive boost signals from the drive signal generator, which are used to vary the bias provided of the first and second sets of bias and impedance match circuitry 204, 206.

The drive circuit 202 of the example of FIG. 2 is configured in a H-bridge topology having upper transistors Q1, Q2 that are coupled to a positive voltage supply (VCC) through a resistor R1. The H-bridge topology also includes lower transistors Q3, Q4 that are respectively coupled to the upper transistors Q1, Q2, and that are also coupled to a ground or negative supply (VEE) through a resistor R2. As shown in FIG. 2, the upper transistors Q1, Q2 may be implemented using PNP transistors having their emitters coupled to R1. The lower transistors Q3, Q4 may be implemented using NPN transistors having their emitters coupled to R2. However, the transistors Q1-Q4 may be implemented using any suitable switching technology, including FETs, etc. The collectors of the upper and lower transistors Q1, Q3 are coupled at a node to form the line HWY and the collectors of the upper and lower transistors Q2, Q4 are coupled at a node to form the line HWX.

Each transistor Q1, Q2, Q3, and Q4 includes a respective base driver 210, 212, 220, 222. As shown in detail in FIG. 2, the base drivers 210, 212, 220, 222 each receive a write data signal (designated using the prefix WD) and a boost signal (designed using the prefix BST). For example, the base drivers 210 and 220 correspond to the Y side of the circuit and therefore both base drivers 210 and 220 receive write data signals and boost signals corresponding to the Y side of the circuit (designated by the suffix Y). However, the upper Y-side base driver 210 receives high side signals (designated with the descriptor H) and the lower Y-side base driver 220 receives low side signals (designated with the descriptor L). Correspondingly, the base drivers 212 and 222 respectively receive high and low write data and boost signals for the upper and lower portions of the X side of the circuit and, therefore, are named accordingly.

In operation of the drive circuit 202, one X-side transistor and one Y-side transistor will be simultaneously enabled to cause current to flow through the write head (not shown in FIG. 2) that is coupled across lines HWY and HWX. The selection of high or low side transistors on the X and Y sides of the circuit dictates the direction of current flow through the write head. For example, if the high, Y-side transistor (i.e., the transistor Q1) is enabled and the low, X-side transistor (i.e., the transistor Q4) is enabled, current will flow a path from VCC, through the resistor R1, the transistor Q1, from HWY to HWX via the write head, through the transistor Q4 and the resistor R2 to VEE. Conversely, if the high, X-side transistor (i.e., the transistor Q2) is enabled and the low, Y-side transistor (i.e., the transistor Q3) is enabled, current will flow a path from VCC, through the resistor R1, the transistor Q2, from HWX to HWY via the write head, through the transistor Q3 and the resistor R2 to VEE.

The base drivers 210, 212, 220, 222 process the write data signals to enable or disable their corresponding transistors (e.g., the transistors Q1, Q2, Q3, and Q4). Additionally, the base drivers 210, 212, 220, 222 process the boost signals to enable their corresponding transistors (e.g., the transistors Q1, Q2, Q3, and Q4) to a greater degree to boost the current therethrough when the boost signals are asserted. That is, a base driver receiving a write data signal may enable its corresponding transistor to a certain degree to cause an emitter current to flow, but when the boost signal is also asserted the base driver enables the corresponding transistor to a greater degree to increase the emitter current and, therefore, the current passed through the write head. Of course, in several examples boost signals for upper and lower transistors on opposite sides of the circuit are enabled. For example, the BST_HY signal may be high at the same time the BST_LX is high. This allows the transistor Q1 to source an increased, or boosted, current and allows the transistor Q4 to sink the increased current.

As described in detail below, during the time periods in which a boost signal is applied to a base driver, a bias current supplied to an impedance matching circuit corresponding to the boosted base driver and its associated transistor is boosted to enable the impedance matching circuit to accommodate the voltage reflections that occur when current through the inductive head is changed and a large voltage results due to the large dI/dt associated with the current change in the inductive head. In particular, as described below, the bias circuits may be controlled by the same boost signal provided to the base driver to which the bias circuit corresponds (e.g., BST_HY, BST_LY, BST_HX, and BST_LX). The Y-side boost signals are signals that are produced by the drive signal generator (e.g., the drive signal generator 120) to cause a current boost through the write head (e.g., the write head 108) at the start of a data write.

The first set of bias and impedance match circuitry 204 includes an impedance match 230 to which first and second variable bias networks 232, 234 are coupled. As shown in FIG. 2, the impedance match 230 may be implemented as a translinear loop that is formed by transistors Q96, Q5, Q93, and Q6, wherein the emitters of transistors Q5 and Q6 are coupled to resistor R3, which is coupled to HWY. According to the topology of the impedance match 230, the emitter of transistor Q96 is coupled to the base of transistor Q5, and the emitter of transistor Q93 is coupled to the base of transistor Q6. The bases of transistors Q96 and Q93 are coupled to a voltage reference VREF1.

According to one example, the first variable bias network 232 includes three resistors R98, R17, and R117 that are connected in series between the base of transistor Q5 and the positive supply VCC. Of course, intervening components such as MOSFETs and the like may be interposed between the resistor R117 and the positive supply. A MOSFET MP108 includes drain and source terminals that are coupled across resistor R117. Similarly, MOSFETS MP30 and MP27 are coupled to one another and collectively coupled across resistors R117 and R17. In the example, of FIG. 2, resistors R98, R17, and R117 have ratiometric values of approximately R/7.02, R/5.26, and R Ohms, respectively. The value of R may be selected based on values of VCC and VEE. MOSFETS MP108 and MP27 include gate terminals that are controlled by the boost signal BST_HY. Thus, the first variable bias network 232 corresponds to the operation of the base driver 210. Although they are shown as MOSFETS in FIG. 2, MP27, MP108, and any other MOSFETS in the circuit may be implemented as switches of any suitable type.

As shown in FIG. 2, the second variable bias network 234 includes three resistors R100, R84, and R121 that are connected in series between the base of transistor Q6 and the negative supply (VEE). Of course, other devices such as MOSFETs may be placed between the resistor R121 and the negative supply. A MOSFET MN54 includes drain and source terminals that are coupled across R121. Similarly, MOSFETS MN70 and MN78 are coupled to one another and collectively coupled across R84 and R121. In the example, of FIG. 2, R100, R84, and R121 have ratiometric values of approximately R/7.02, R/5.26, and R Ohms, respectively. The value of R may be selected based on values of VCC and VEE. MOSFETS MN54 and MN70 include gate terminals that are controlled by the boost signal BST_LY. Thus, the second variable bias network 234 corresponds to the operation of the base driver 220.

The second set of bias and impedance match circuitry 206 is similar to the first set of bias and impedance match circuitry 204 in that it includes an impedance match 240 to which first and second variable bias networks 242, 244 are coupled. As shown in FIG. 2, the impedance match 240 may be implemented as a translinear loop that is formed by transistors Q95, Q11, Q94, and Q12, wherein the emitters of transistors Q11 and Q12 are coupled to resistor R5, which is coupled to HWX. According to the topology of the impedance match 240, the emitter of transistor Q95 is coupled to the base of transistor Q11, and the emitter of transistor Q94 is coupled to the base of transistor Q12. The bases of transistors Q95 and Q94 are coupled to a voltage reference VREF2.

According to one example, the first variable bias network 242 includes three resistors R103, R102, and R30 that are connected in series between the base of transistor Q11 and the positive supply VCC, which may be gated by, for example, a MOSFET. A MOSFET MP70 includes drain and source terminals that are coupled across resistor R30. Similarly, MOSFETS MP29 and MP31 are coupled to one another and collectively coupled across resistors R30 and R102. In the example, of FIG. 2, resistors R103, R102, and R30 have ratiometric values of approximately R/7.02, R/5.26, and R Ohms, respectively. The value of R may be selected based on values of VCC and VEE. MOSFETS MP70 and MP31 include gate terminals that are controlled by the boost signal BST_HX. Thus, the first variable bias network 242 corresponds to the operation of the base driver 212.

As shown in FIG. 2, the second variable bias network 244 includes three resistors R106, R107, and R63 that are connected in series between the base of transistor Q12 and the negative supply (VEE), which may be gated by a MOSFET. A MOSFET MN53 includes drain and source terminals that are coupled across R63. Similarly, MOSFETS MN72 and MN86 are coupled to one another and collectively coupled across R107 and R63. In the example, of FIG. 2, R106, R107, and R63 have ratiometric values of approximately R/7.02, R/5.26, and R Ohms, respectively. The value of R may be selected based on values of VCC and VEE. MOSFETS MN53 and MN72 include gate terminals that are controlled by the boost signal BST_LX. Thus, the second variable bias network 244 corresponds to the operation of the base driver 222.

A description of the operation of the drive write system 200 of FIG. 2 is now provided with respect to an example in which a current is to be launched into the drive head (not shown) from the line HWY. It should be understood that the launching of a current from the line HWX through the head proceeds in a similar and complimentary manner.

When a data bit is to be written to a platter, enabling write data signals and boost signals are generated for both the Y and X branches of the system 200. In particular, write signals WDHY and WDLX are generated, as are boost signals BST_HY and BST_LX. The write and boost signals are provided to the base drivers 210 and 222, as well as to the bias networks 232, and 244.

The base drivers 210 and 222 respectively enable transistors Q1 and Q4 to generate boosted current signals having overshoot portions. The overshoot portions last as long as the boost signals are asserted. As noted previously, the write head is highly inductive and, therefore, boost current from the transistor Q1 to be launched in the write head results in a high voltage a node HWY. The high voltage at node HWY results in the emitter of transistor Q5 having a voltage approaching that of the base of transistor Q5. Thus, the base bias current ($i_{B1}$) of transistor Q5 tends to lessen as operation of Q5 approaches a cut-off state of operation.

However, according to the system 200 described herein, the boost signal (BST_HY) causes the bypassing of one or both of resistors R117 and R17. Thus, during boost, the resistance between VCC and the base of Q5 is reduced from approximately 2799.4 Ohms to either 299.15 Ohms or 698.33 Ohms. The decrease in the resistance between VCC and the base of Q5 increases the current flow ($i_{B1}$) through Q5, thereby ensuring that Q5 remains in an active region during boost operations that would normally generate voltage reflections that could cause Q5 to go into a cut-off state. Whether the resistance between VCC and the base of Q5 is reduced to 299.15 Ohms or 698.33 Ohms depends on the state of the signal X2G_plus. If the signal X2G_plus is in such a state that MP30 is enabled, both resistors R117 and R17 are effectively bypassed by the combination of MP30 and MP27. Thus, the bypassing of one or both of the resistors R17 and R117 during boost enables boost conditions to be accommodated, while reducing not bypassing the resistors R17 and R117 enables quiescent current draw savings when extra current to the base of Q5 is not needed.

As explained above, when transistor Q1 is enabled, transistor Q4 is enabled to handle current passed through the write head. To that end, the write signal WDLX and the boost signal BST_LX cause the base driver 222 to enable the transistor Q4. In boost mode, the transistor Q4 is turned on harder than during non-boost mode. As explained above, when a boost current is launched into the write head, node HWY experiences a high voltage due to the current change in the inductive write head. However, the node HWX experiences a negative voltage, which pulls the emitter of transistor Q12 down and reduces the base current ($i_{B2}$) thereof. When the base current ($i_{B2}$) is reduced through transistor Q12, transistor Q12 approaches cut-off. Accordingly, to avoid cut-off of transistor Q12, the resistance between the base of transistor Q12 and VEE is reduced during boost mode by MOSFET MN53 bypassing R63 and/or MOSFETS MN72 and MN86 bypassing R63 and R107. Thus, during boost, the resistance between the base of Q12 and VEE is reduced from approximately 2799.4 Ohms to either 299.15 Ohms or 698.33 Ohms. The decrease in the resistance between the base of transistor Q12 and VEE increases the current flow ($i_{B2}$) from the base of transistor Q12, thereby ensuring that transistor Q12 remains in an active region during boost operations that would normally generate voltage reflections that could cause transistor Q12 to go into a cut-off state. Whether the resistance between the base of transistor Q12 and VEE is reduced to 299.15 Ohms or 698.33 Ohms depends on the state of the signal L2G_plus. If the signal X2G_plus is in such a state that MOSFET MN86 is enabled, both resistors R63 and R107 are effectively bypassed by the combination of MOSFETS MN72 and MN86. Thus, the bypassing of one or both of the resistors R63 and R107 during boost enables boost conditions to be accommodated, while reducing not bypassing the resistors R63 and R107 enables quiescent current draw savings when extra current from the base of transistor Q12 is not needed.

Although the foregoing example focuses on the operation of the circuit when transistors Q1 and Q4 are enabled, a similar operation occurs when transistors Q2 and Q3 are enabled, except that variable bias networks 242 and 234 are used during the operation of Q2 and Q3, respectively. That is, when transistor Q2 is operated in boost mode, MOSFETS MP70 and MP31 bypass one or both of R30 and R102. Additionally, when transistor Q3 is operated in boost mode, MOSFETS MN 54 and MN 70 bypass one or both of R121 and R84. Thus, the dynamic nature of switching resistances into and out of the variable bias networks allows the use of additional current in the system when it is needed enables the circuit to function when more current is needed and to save power by reducing current when less current is needed for circuit operation.

While the foregoing description and drawings set forth examples of implementations that may be carried out, variations may apply. For example, some or all of the discrete components shown in FIG. 2 may be integrated into one or more integrated circuits (ICs). Of course, some of the components may be discrete components. Alternatively, a combination of discrete and integrated components may be used.

Additionally, while single resistors are shown in FIG. 2, such resistors may be implemented using resistor networks of series or parallel resistors that may be individually trimmed to precise resistance values. Any number of resistors may be used. Additionally, some of the transistors shown in FIG. 2 may include multiple emitters to allow enhanced current carrying ability. For example, transistors Q1 and Q2 may be implemented using four or any other desirable number of emitters, the quantity of which is selected based on current demands of the circuit. Additionally, Q4 and Q12 may also be implemented using multiple emitter devices including, for example, four emitters, or any other desirable number of emitters.

Figure 3:
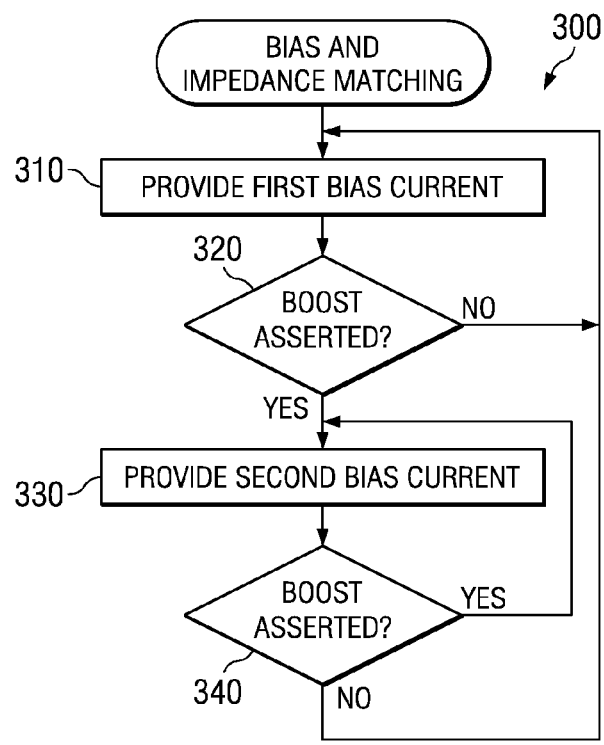
FIG. 3 is a flowchart representative of an example process to control bias and impedance matching that may be carried out in the circuits and systems shown in FIGS. 1 and 2.

FIG. 3 shows a flowchart representative of an example bias and impedance matching process 300 that may be implemented by all, or at least portions of, the circuits and systems shown in FIGS. 1 and 2. The example bias and impedance matching process 300 begins with a variable bias network (e.g., the variable bias network 232) providing a first bias current (e.g., $i_{B1}$) to a hard drive loop circuit (e.g., the hard drive loop circuit 230) (block 310). While providing the first bias current to the hard drive loop circuit, the process 300 monitors for the assertion of a boost signal that is used to boost write current provided to the hard drive write head (block 320).

While the boost signal is not asserted, the first bias current is provided (block 310). However, when the boost signal has been detected (block 320), a second bias current (e.g., an increased magnitude $i_{B1}$) is provided to the hard drive loop circuit (block 330). As described above in conjunction with FIG. 2, the detection of the boost signal assertion may be carried out by the fact that a digital signal indicative of a boost signal (e.g., BST_HY) is provided to the gate of one or more transistors (e.g, MP27 and MP108). In this case, the transistors will detect the assertion of the boost signal via the changed voltage at their gates. In the example of FIG. 2, the changed gate voltage causes the transistors to bypass one or more resistors that are in circuit between a supply voltage (e.g., VCC) and the loop circuit. The bypassing of such resistors results in an increased current that flows from the bias circuit to the loop circuit.

The second, increased bias current will flow until the process 300 determines that the boost signal is no longer asserted (block 340). Thus, as long as the boost signal is asserted, the second bias current is provided (block 330). However, when the boost signal is no longer asserted (block 340), the first bias current will be provided (block 310). In this manner, the bias current and, therefore, impedance matching of the system is controlled by the assertion of the boost signal.

While the foregoing explanation of FIG. 3 makes reference by example to the variable bias network 232 as providing a first bias current or a larger, second bias current to the loop circuit 230, other examples exist. For example, the foregoing description of the process 300 applies also to the variable bias circuit 244 and the loop circuit 240, wherein the variable bias circuit 244 will increase the current drawn from the loop circuit 240 under boost conditions. In this case, a larger negative current is provided by the variable bias circuit 244 when a boost condition is asserted. Both of the foregoing descriptions of FIG. 3 are merely examples and other examples exist.

Although certain example apparatus, methods, and articles of manufacture are described herein, other implementations are possible. The scope of coverage of this patent is not limited to the specific examples described herein. On the contrary, this patent covers all apparatus, methods, and articles of manufacture falling within the scope of the invention.

What is claimed is:

1. A hard disk drive write system comprising:
   a drive signal generator configured to receive data to be written to a hard disk drive platter and to generate drive signals based thereon, wherein the drive signals include a boost signal;
   a drive circuit electrically coupled to the drive signal generator and to a transmission line and configured to receive the drive signals and to generate currents for output to the transmission line based thereon, wherein the currents include a boost current;
   a variable bias circuit electrically coupled to the drive signal generator and an impedance matching circuit, wherein the variable bias circuit is configured to detect the boost signal generated by the drive signal generator and to vary a bias signal provided to the impedance matching circuit based on the detection of the boost signal; and
   the impedance matching circuit electrically coupled to the variable bias circuit, the drive circuit, and the transmission line to match impedances between the drive circuit and the transmission line in response to the bias signal provided by the variable bias circuit.

2. The hard disk drive write system of claim 1, wherein the variable bias circuit increases a bias current to the impedance matching circuit in response to the detection of the boost signal.

3. The hard drive write system of claim 2, wherein the impedance matching circuit comprises a translinear loop circuit.

4. The hard drive write system of claim 3, wherein the bias current is injected into a base of a transistor within the translinear loop.

5. The hard drive write system of claim 3, wherein the bias current is a current flowing from the impedance matching circuit to the variable bias circuit.

6. A hard disk drive write circuit comprising:
   a first bias circuit comprising a first plurality of resistors and a first transistor for selectively bypassing at least one of the first plurality of resistors, wherein the first transistor is controlled by a first boost signal such that the first transistor bypasses the at least one of the first plurality of resistors when the first boost signal is asserted, and wherein the first bias circuit provides a first bias current when the at least one of the first plurality of resistors is bypassed and provides a second bias current when the at least one of the first plurality of resistors is not bypassed;
   a second bias circuit comprising a second plurality of resistors and a second transistor for selectively bypassing at least one of the second plurality of resistors, wherein the second transistor is controlled by a second boost signal such that the second transistor bypasses the at least one of the second plurality of resistors when the second boost signal is asserted, and wherein the second bias circuit sinks a first bias current when the at least one of the second plurality of resistors is bypassed and sinks a second bias current when the at least one of the second plurality of resistors is not bypassed; and
   a loop circuit electrically coupled to the first bias circuit at a first point and electrically coupled to the second bias circuit at a second point and wherein the loop circuit is coupled to a first terminal to which a hard drive write head is to be coupled.

7. The hard disk drive write circuit of claim 6, wherein the loop circuit comprises a translinear loop including first, second, third and fourth transistors, and wherein the first point at which the loop circuit is coupled to the first bias circuit comprises a base of the first transistor and wherein the second point at which the loop circuit is coupled to the second bias circuit comprises a base of the fourth transistor.

8. The hard disk drive write circuit of claim 7, wherein the first boost signal is not asserted when the second boost signal is asserted.

9. The hard disk drive write circuit of claim 8, wherein the loop circuit is a first loop circuit, the hard-disk drive write circuit further comprising a third bias circuit, a fourth bias circuit and a second loop circuit coupled to the third bias circuit at a third point and coupled to the fourth bias circuit at a fourth point, and wherein the second loop circuit is coupled to a second terminal to which the hard drive write head is to be coupled.

10. The hard disk drive write circuit of claim 9, wherein third bias circuit is controlled by a third boost signal to provide a third bias current having a selectable magnitude and wherein the fourth bias circuit is controlled by a fourth boost signal to provide a fourth bias signal having a selectable magnitude.

11. The hard disk drive write circuit of claim 10, wherein an H-bridge topology circuit is coupled to the first and second terminals.

12. The hard drive write circuit of claim 11, further comprising a hard drive write head coupled to the first and second terminals.

13. A hard disk drive system comprising:
a drive circuit comprising:
a first drive transistor having a collector, a base, and an emitter, wherein the emitter of the first drive transistor is electrically coupled to a first voltage supply;
a second drive transistor having a collector, a base, and an emitter, wherein the collector of the second drive transistor is electrically coupled to the collector of the first drive transistor and the emitter of the second drive transistor is electrically coupled to a second voltage supply;
a third drive transistor having a collector, a base, and an emitter, wherein the emitter of the third drive transistor is electrically coupled to the first voltage supply;
a fourth drive transistor having a collector, a base, and an emitter, wherein the collector of the fourth drive transistor is electrically coupled to the collector of the third drive transistor and the emitter of the fourth drive transistor is electrically coupled to the second voltage supply;
a first driver electrically coupled to the base of the first drive transistor and configured to drive the first drive transistor based on a first write signal and a first boost signal;
a second driver electrically coupled to the base of the second drive transistor and configured to drive the second drive transistor based on a second write signal and a second boost signal;
a third driver electrically coupled to the base of the third drive transistor and configured to drive the third drive transistor based on a third write signal and a third boost signal;
a fourth driver electrically coupled to the base of the fourth drive transistor and configured to drive the fourth drive transistor based on a fourth write signal and a fourth boost signal;
a first impedance matching circuit comprising:
a first matching transistor having a collector, a base, and an emitter;
a second matching transistor having a collector, a base, and an emitter, wherein the emitter of the second matching transistor is electrically coupled to the emitter of the first matching transistor and is further electrically coupled to the collectors of the first and second drive transistors;
a third matching transistor having a collector, a base, and an emitter, wherein the emitter of the third matching transistor is electrically coupled to the base of the first matching transistor;
a fourth matching transistor having a collector, a base, and an emitter, wherein the emitter of the fourth matching transistor is electrically coupled to the base of the second matching transistor;
a first bias circuit electrically coupled to the base of the first matching transistor, the first bias circuit comprising a first plurality of resistors and a first selection transistor for selectively bypassing at least one of the first plurality of resistors, wherein the first selection transistor is controlled by the first boost signal such that the first selection transistor bypasses the at least one of the first plurality of resistors when the first boost signal is asserted, and wherein the first bias circuit provides a first bias current when the at least one of the first plurality of resistors is bypassed and provides a second bias current when the at least one of the first plurality of resistors is not bypassed; and
a second bias circuit electrically coupled to the base of the second matching transistor, the second bias circuit comprising a second plurality of resistors and a second selection transistor for selectively bypassing at least one of the second plurality of resistors, wherein the second selection transistor is controlled by the second boost signal such that the second selection transistor bypasses the at least one of the second plurality of resistors when the second boost signal is asserted, and wherein the second bias circuit sinks a third bias current when the at least one of the second plurality of resistors is bypassed and sinks a fourth bias current when the at least one of the second plurality of resistors is not bypassed.

14. A method of controlling bias in a hard disk drive write circuit, the method comprising:
providing a first bias current to a hard drive loop circuit during a non-boost condition;
detecting assertion of a boost signal used to boost a write current provided to a write head; and
in response to the detection of the assertion of the boost signal, providing a second bias current different from the first bias current to the hard drive loop circuit.

15. The method of claim 14, wherein the second bias current is greater than the first bias current.

16. The method of claim 15, wherein providing the second bias current comprises bypassing a resistance that is not bypassed to provide the first bias current.

17. The method of claim 16, wherein bypassing the resistance includes bypassing the resistance with a transistor switch.

18. The method of claim 17, wherein the boost signal is coupled to the control pin.

19. The method of claim 18, wherein the resistance is a single resistor.

20. The method of claim 19, further comprising detecting de-assertion of the boost signal used to boost the write current provided to the write head and in response to the detection of the de-assertion of the boost signal providing the first bias current to the hard drive loop circuit.

* * * * *